United States Patent [19]

Hruska et al.

[11] Patent Number: 4,853,101

[45] Date of Patent: Aug. 1, 1989

[54] POROUS SEPARATOR COMPRISING INORGANIC/POLYMER COMPOSITE FIBER AND METHOD OF MAKING SAME

[75] Inventors: Louis W. Hruska, Geneva; Carl W. Brown, Jr., Painesville, both of Ohio

[73] Assignee: ELTECH Systems Corporation, Boca Raton, Fla.

[21] Appl. No.: 55,661

[22] Filed: May 29, 1987

Related U.S. Application Data

[63] Continuation of Ser. No. 768,880, Aug. 27, 1985, abandoned, which is a continuation-in-part of Ser. No. 651,247, Sep. 17, 1984, abandoned.

[51] Int. Cl.$^4$ .............................................. C25B 13/00
[52] U.S. Cl. .................... 204/296; 204/296; 204/283; 204/252; 427/243; 427/372.2; 427/376.2; 427/375; 427/384; 427/385.5; 162/157.2; 162/157.5
[58] Field of Search ............... 204/283, 296, 252, 295; 162/105, 106, 157.2, 157.5; 427/58, 243, 245, 216, 247, 372.2, 375, 384, 385.5, 122

[56] References Cited

U.S. PATENT DOCUMENTS

| | | | |
|---|---|---|---|
| 3,674,676 | 7/1972 | Fogelman | 204/286 |
| 3,694,281 | 9/1972 | Leduc | 156/77 |
| 3,723,264 | 3/1973 | Leduc | 204/80 |
| 4,036,729 | 7/1977 | Patil et al. | 204/96 |
| 4,070,257 | 1/1978 | Motani et al. | 204/98 |
| 4,126,536 | 11/1978 | Balko et a. | 204/296 |
| 4,138,314 | 2/1979 | Patel et al. | 162/157.5 |
| 4,168,221 | 9/1979 | Kodija et al. | 204/296 |
| 4,253,935 | 3/1981 | Simmons | 204/295 |
| 4,354,900 | 10/1982 | Bailey et al. | 204/295 |
| 4,410,411 | 10/1983 | Fenn, III et al. | 204/283 |
| 4,444,640 | 4/1984 | Tsai et al. | 204/283 |
| 4,482,441 | 11/1984 | Indeherberg et al. | 204/128 |
| 4,606,805 | 8/1986 | Bon | 204/296 |

FOREIGN PATENT DOCUMENTS 834895 2/1970 Canada ................. 319/37

OTHER PUBLICATIONS

"New Separators for Nickel-Cadmium Cells", Proc. of the Intersociety Energy Conversion Conference, 16th, 1981, H. S. Lim, S. A. Verzwyvelt, A. E. Schmitz, J. D. Margerum, and R. C. Knechtli.

Primary Examiner—John F. Niebling
Assistant Examiner—Kathryn Gorgos
Attorney, Agent, or Firm—John J. Freer

[57] ABSTRACT

A dimensionally stable separator comprising inorganic/polymer composite fibers and a method of making same is disclosed. The separator can be employed as a diaphragm for use in electrolytic cells, such as for the production of chlorine and caustic. The methods of separator preparation can include direct coating onto a foraminous substrate, e.g., a cathode, from a slurry or paste of inorganic/polymer composite fibers.

32 Claims, No Drawings

POROUS SEPARATOR COMPRISING INORGANIC/POLYMER COMPOSITE FIBER AND METHOD OF MAKING SAME

CROSS-REFERENCE TO RELATED APPLICATION

This is a continuation of application Ser. No. 768,880, filed Aug. 27, 1985, now abandoned, which in turn is a continuation-in-part of application Ser. No. 651,247, filed Sept. 17, 1984, now abandoned.

BACKGROUND OF THE INVENTION

A large number of the electrolytic cells now in existence employ diaphragms. Many of the cells used in the production of chlorine and caustic by the electrolysis of brine are diaphragm type cells. In general, these diaphragms are formed by deposition directly on a foraminous cathode. In the past, the deposition could be expected to be from a slurry of asbestos fibers. Such asbestos diaphragms have the serious disadvantage that in operation the asbestos swells considerably, e.g., up to 800 percent, filling the anode-cathode gap and thus increasing cell voltage and subjecting the diaphragm itself to attrition by gas released at the now proximate anode surface.

One variation to alleviate swelling of a conventional asbestos diaphragm for electrolytic cells for chlorine and caustic production was to make the diaphragm from asbestos together with a polymer, particularly a fluorine-containing polymer. See for instance, (Fenn et al) U.S. Pat. No. 4,410,411 and (Motani et al) U.S. Pat. No. 4,070,257. Related art, (Leduc et al) U.S. Pat. Nos. 3,723,264 and 3,694,281 disclose asbestos-polymer diaphagms for electrolytic cells for olefin production.

Also, some background art shows zirconia-modified asbestos diaphragms, such as (Hruska et al) U.S. Pat. No. 4,354,900. In this patent zirconia is added as a solution or powder merely as a modifier of the asbestos fiber and thus the diaphragm is not made of a composite fiber, but rather a mixture of the asbestos fiber and polymer modifier.

It has also been proposed to incorporate extremely finely divided particles into molten thermoplastics. The resulting thermoplastics can then be shaped. For example, U S. Pat. No. 4,126,536 discusses the addition of sub-micron-sized particles, such as of titanium dioxide to such a molten substance. In shaping, the resultant material can be extruded through a die and the extrudate broken into fibers useful for preparing diaphragms. However, the resulting product has the particles incorporated in the fiber, i.e., encapsulated therein; thereby losing the surface character of the fine particles within the polymer.

Lastly, general background art includes a modification of a Teflon TM felt diaphragm with zirconia/magnesia for use in an electrolytic cell for chlorine and alkali metal hydroxide production. This is represented by U.S. Pat. No. 4,253,935. But like other background art, the patent to Simmons does not make any composite fiber diaphragm, but rather uses an inorganic to coat the polymer.

However, the polymer-modified asbestos diaphragms known in the art still show around 25% swelling of the asbestos, and thus are still subject to some chemcial attack and are not substantially resistant to changes in operating conditions. Therefore, they have a limited life.

In all of this prior art of polymer and inorganic, the mixture of polymer and inorganic in the diaphragm does not exhibit any non-uniform morphology in the fiber product structure. According to the prior art, the concurrent use of a polymer and an inorganic in a diaphragm does not require the formation of any non-isotropic intermediate, composite fiber in making the diaphragm. In other words, a composite fiber is not formed, but rather the polymer is simply used to "glue" the inorganic fiber together in the diaphragm.

SUMMARY OF THE INVENTION

There has now been discovered an especial inorganic-polymer composite fiber separator, preferably a diaphragm for use in an electrolytic cell, particularly an electrolytic cell for chlorine and caustic production. The diaphragm is not only substantially chemical-attack resistant in the environment of a diaphragm cell but also is resistant to changes in operating conditions because it can provide for reduced swelling, as in comparison with the polymer-modified asbestos diaphragm. Thus, it has a long life. Moreover, since the present diaphragm does not employ free asbestos, there is obviated the well known health hazard to those workers involved with asbestos. The diaphram of the present invention could utilize some asbestos as an inorganic, but it is preferred to use an asbestos-free formulation. Since the diaphram can be asbestos-free, it can thus avoid the well-known health hazards attendant asbestos.

Thus, the present invention provides a dimensionally stable diaphragm in a cell, which diaphragm can be directly deposited on the cathode of an electrolytic cell. Also, the present invention provides a method for such direct deposition. In particular, the cell may be a chloralkali cell for chlorine/caustic production.

In its broadest aspect, the present invention provides a porous and dimensionally stable separator comprising a heat-induced fused interconnection of non-isotropic composite fibers in matted form having inorganic particulates embedded in a polymer fiber surface, the individual fibers before matting comprising a non-isotropic, organic and inorganic fiber composite of non-uniform morphology comprising an organic polymer in fiber form having a multitude of very finely-divided inorganic, refractory particulates bound firmly with the polymer fiber at least substantially within the surface thereof so as to provide a firm surface binding of inorganic particulates resistant to physical separation from the polymer fiber without fiber destruction.

The present invention also provides a method of providing a hydraulically permeable, dimensionally stable diaphragm on a substrate, said diaphragm being for use in an electrolytic cell, which method comprises:

(a) forming a slurry or paste of the non-isotropic, organic and inorganic composite fibers as set out above;

(b) depositing, by means of a pressure differential, said slurry or paste as a uniform mixture of said inorganic/polymer composite fibers onto a substrate;

(c) subjecting the deposit to a temperature sufficient and for a time sufficient to allow the composite fibers to fuse together thereby forming a mechanically stable, permeable mat; and (d) cooling to substantially room temperature, whereby there is obtained a diaphragm dimensionally stable under operating cell conditions.

One main advantage of the present invention is that it allows the application of a superior asbestos-free diaphragm directly on the cathode of a conventional chlor-alkali cell that would typically employ an asbestos diaphragm. No new cell design or redesign is required. As compared to a conventional asbestos diaphragm and its use in a chlor-alkali cell, the dimensionally stable asbestos-free inorganic-polymer diaphragms of the present invention provide a number of other advantages not specifically enumerated hereinabove. (1) Such diaphragms are found to enjoy a longer useful life without replacement. (2) Assembly, disassembly, and reassembly of the cell is facilitated since the heat treatment apparently hardens and strengthens the diaphragm, thus rendering it less susceptible to damage. (3) The swelling ordinarily encountered with a conventional prior art asbestos diaphragm (up to 800 percent) and prior art polymer-modified diaphragm of around 25 percent of the original diaphragm thickness can be very deleterious. The instant diaphragm exhibits substantially no swelling under operatihg conditions. Because of this, it is now possible to reduce further the anode-diaphragm gap, and hence further lower the cell voltage, by mechanical means such as the "expandable" anodes described in U.S. Pat. No. 3,674,676. (4) The present diaphragms readily lend themselves to removal of impurities by an acid wash without diaphragm degredation. (5) The diaphragms of the present invention do not appear as susceptible to damage by the unavoidable current fluctuations experienced during extended periods of in-plant operation.

DESCRIPTION OF THE PREFERRED EMBODIMENTS

There is prepared a slurry or paste of composite inorganic/polymer fibers in an appropriate liquid media. How to make these composite fibers is disclosed in commonly assigned copending U.S. Pat. applications Ser. No. 651,248, and Ser. No. 768,880, the disclosures of which are incorporated herein by reference.

In general, the composite fibers are made using in part an inorganic particulate that is a substance or mixture of substances which is refractory, i.e., will retain particulate integrity under the physical conditions of composite fiber formation, while being inert to the polymer fiber substrate. By being inert, the non-organic will be a substance capable of being physically bound to the polymer in processing without chemically reacting with such polymer. Suitable inorganic substances may be oxides, carbides, borides, silicides, sulfides, nitrides or mixtures of these substances. Also, there may be suitably employed as the non-organic, silicates, e.g., magnesium silicates and alumino-silicates, aluminates, ceramics, cermets, carbon or mixtures thereof. It is also contemplated to use particulate metals and alloys as well as mixtures, including, for example, mixtures of metals and metal oxides. Especially preferred is zirconia as the inorganic.

The inorganic may be small fragments and these are virtually always very finely divided, e.g., generally all more finely divided than about 100 mesh (about 150 microns) and most usually all more finely divided than about 400 mesh (36 microns), thus providing finely-divided, "micron-sized" particulates. However, sub-micron-sized particulates, which have at least substantially all particles finer than one micron, must be used with caution so as to avoid substantial to virtually complete particle encapsulation in the fiber composite during fiber formation. Such gross encapsulation diminishes the benefit which may be derived from particulates at the surface of the fibers. Thus, sub-micron-sized particulates are preferably avoided, or are blended with micron-sized particulates before or in use. Generally, when used herein, "micron-sized" means very finely-divided particulates more coarse than the sub-micron-sized particulates, but nonetheless having a major weight portion, i.e., greater than 50 weight percent, more finely-divided than 100 mesh. Mesh as used herein is U.S. Sieve Series. Zirconia, will often be employed as a micron-sized particulate, e.g., powder having an average particle size of from 1 to 16 microns, and more typically will be of average particle size from about 5 to 12 microns. Often, many particulates will be sufficiently finely-divided so as to be encapsulated in the fiber but will be only superficially embedded owing to the composite fiber formation conditions, such as temperature and length of formation time.

The useful polymer precursor of the composite fibers is generally any polymer, copolymer, graft polymer or combination thereof which is suitable for being chemically and mechanically resistant to the operating conditions in which the composite fiber will be employed. As an example, chemically resistant for use in a chlor-alkali cell is meant resistant to degradation with respect to the cell chemicals, e.g., caustic. By mechanically resistant for such example, the polymer should be selected so that the composite can maintain a high modulus, i.e., be resistant to inelastic deformation at above normal temperature, e.g., at temperatures up to 100° C. or mor, such as up to about 250° C. for polytetrafluoroethylene (hereinafter generally referred to as PTFE polymer). The polymer will be used in particulate form. Typically, dispersions of pulverulent polymer are used and preferably for ease of composite fiber production, these particles of the dispersion will have finely-divided character such that their size range is between about 0.05 to 200 microns in diameter. For example, commercially available particulate PTFE polymer dispersions can be obtained which have polymer particles having diameters ranging up to about 0.5 micron.

As the useful polymers, particularly advantageous are the halogen-containing polymers which include fluorine, e.g., fluorine-containing or fluorine- and chlorine-containing polymers, such as polyvinyl fluoride, polyvinylidene fluoride, PTFE polymer, polyperfluoroethylene propylene, polyfluoroalkoxyethylene (herein often referred to as PFA polymer); polychlorotrifluoroethylene (herein generally referred to as PCTFE polymer), and the copolymer of chlorotrifluoroethylene and ethylene (herein usually referred to as CTFE polymer).

Although simple dry mixtures can be successfully processed to prepare suitable fiber composites, a liquid medium may also be employed. A liquid medium that can be useful in composite preparation is usually aqueous. This may be only water.

To enhance formation of the non-organic-polymer composite fibers, it is preferred to employ a fiber-inducing substrate in the mix with a mixture of polymer plus inorganic. Such a substrate can serve to enhance formation of polymer fiber, or maintain a polymer in fiber form, and thus contribute to desirable composite fiber production. Preferably, the fiber-inducing substrate is a solid, pulverulent, inert material, or mixture of such materials, e.g., a material or mixture that by being inert will not react chemically with the polymer or the inorganic. Group I or Group II metal salts can be useful. Usually such pulverulent material is in granular form. Typical substrate materials are salt (NaCl), CaZrO₃, alumina, limestone, sugar, sand, graphite, and the like. After use, the substrate particles can be removed from the composite fibers by any mechanical means or combination thereof suitable for separating particulates from fiber, e.g., screening whereby the large substrate particles are screened from the fiber.

Processing should include an elevated mix temperature, e.g., a step of heating the polymer and inorganic at an elevated temperature and for a time dependent upon the identity of the polymer material employed, while vigorously grinding and/or shearing the polymer and inorganic in a grinding and/or shearing action, e.g., as by ball milling. Preferably, a ball mill is used, but a shearing blender, a ribbon blender, double screw blender, Brabender ™ mixer, Banbury ™ mixer, or Hobart ™ mixer may also be used. As long as there is a heating means available in association with the blender, any vigorous shearing and/or grinding action may be employed.

During the heated grinding and/or shearing, as by milling, the heating will be insufficient to provide that the polymer becomes readily free-flowing, but such that the polymer will flow such as when impacted. The polymer is, therefore, in the nature of being malleable. If the polymer was permitted to flow without shear, e.g., by excessive elevated temperature heating, discrete fiber production could not be attained. Thus the temperature is maintained below the heat induced flow temperature. The polymer particulates will each thereby be typically individually sheared and, being malleable, will be smeared and attenuated to a fibrillated form, e.g., by being impacted by milling. Also, the operation tends to "grow" polymer fibers from polymer particulates, with individual sheared particles often attaching under heated, impact flow condition, one to the other as they are attenuating to provide the growth. Typically, as in an impact grinding action the resulting fiber forms will mimic spiders or trees in form, e.g., be branched or have a nucleus with spokes. A great variety of fiber forms can however be expected, including some short and stocky unbranched individual fibers as well as much more lengthy and branched forms. The predominant fiber forms can be somewhat related to the grinding method with an impact grinding action using an exemplary PTFE polymer/zirconia blend, providing a high degree of more branched spider and tree shapes whereas a rotating grinding action with such blend can lead to more individual fibers.

At the same time during the forming and growing of the fibers, the inorganic particulates are being firmly bound to the fibrous polymer substrate. Such binding is mechanically-induced and can include a broad range of attachment, with some particles being more substantially exposed at the polymer surface, as by partial embedment therein in the nature of a tooth in a gum, while others can be encapsulated if shearing action and fiber growth is continued. It is important that not all of the inorganic particulates be fully encapsulated by the polymer fiber. This assures imparting some of the inorganic particulate character to the fiber surface, e.g., hydrophobicity where a hydrophilic polymer is used. Usually, a broad range or continuum of particle binding in the polymer substrate will be easily and efficiently achieved, ranging from a somewhat loose appearing embedment, but including some particulate encapsulation. Such range can be influenced by the grinding action used, the temperature employed, the proportion of the inorganic and the grinding time.

In preparing the slurry of inorganic/polymer fibers for making the separator, the liquid medium is usually aqueous. It is to be understood that the slurry can have any viscosity serviceable for separator preparation, varying from a very thin mixture of only a minor amount of well dispersed fibers, up to thick mixtures more in the nature of a paste. Although liquids other than aqueous are contemplated to be useful, e.g., hydrocarbon and halohydrocarbon liquids, as well as mixtures of liquids including mixtures with water, such a medium will most always simply be water, for economy. This liquid medium suitably may be aqueous, containing only a very low concentration of a base, or it may be brine, or cell liquor, which can be synthetic or natural, e.g., containing about 15 percent NaCl and 15 percent NaOH, or mixtures of any of the foregoing. Such a low concentration of base can be less than one weight percent of usually just a hydroxide such as an alkali metal hydroxide. Generally the low concentration will be from below one weight percent to 0.01 weight percent of base, and preferably, for economy, is from 0.05 to 0.5 weight percent. Highly concentrated basic solutions can also be used, such as greater than 30 weight percent and including as much as 50 weight percent, even up to saturation. Thus in general, a concentration of base from about 0.01 weight percent up to saturation can be utilized. Furthermore, the concentration of salt (NaCl) in the slurry medium may also vary to the same extent if desired, e.g., from about 0.01 weight percent up to saturation. Where salt has been used as a fiber-inducing substrate in composite fiber manufacture and residual salt is retained in the fiber, such can dissolve in the liquid medium during diaphragm formation.

The base is virtually always hydroxide, typically alkali or alkaline earth metal hydroxides or their mixtures. Most always these will be sodium or potassium hydroxide with the sodium hydroxide being preferred for economy.

Additionally, the slurry may contain components intended to modify the physical properties of the slurry. Generally, a surfactant is employed to wet the materials. This may be any of the numerous known wetting agents, usually a nonionic surfactant although others are contemplated for use. Representative non-ionic surfactants include octyl phenoxy polyethoxy ethanol and dioctyl sodium sulfosuccinate. Also thickening agent, e.g., from about 0.5 to 2.5 grams per liter of slurry of thickening agent, may be present, such as of a xanthan gum derivative agent. Such agent can be added to a fiber-containing medium or, more typically, the agent is first blended with the medium and then the composite fiber is admixed thereto. Such additional slurry components may also even include other fibers, and these fibers may comprise asbestos fibers, although such are not preferred for health reasons.

The slurries of the present invention generally contain from 5 to 600, preferably 50 to 200, grams per liter of solids (inorganic/polymer composite fiber plus any, usually residual, fiber inducing substrate or the like) and from 0.01–0.1 weight percent surfactant. The amount of polymer to be present in the composite inorganic/polymer fiber will vary with the identity of the polymer and particularly with its physical form and has been more particularly discussed hereinabove.

The separator may be preformed by any method useful in such art. For example, a slurry of diaphragm-forming ingredients may be prepared and deposited in conventional paper-making procedure, or a release substrate, usually a film, may be utilized with the diaphragm formed thereon and then released in mat or film form for application to a cathode, such as has been discussed for example in U.S. Pat. No. 4,070,257. Thus the substrate on which the slurry materials may be deposited include generally any such backing member that may be useful and is often porous, such as a screen, perforate plate, backing member, e.g., a film, or cathode. Generally, such cathodes are provided with a diaphragm by immersion in a slurry followed by drawing a vacuum on the catholyte chamber. This results in the desired deposition of the diaphragm, primarily on the active cathode surfaces, such as has been discussed for example in U.S. Pat. No. 4,410,411. In the preferred method, the diaphragm is directly deposited on the cathode. Typically this is achieved after a uniform slurry of inorganic/polymer composite fibers has been obtained, and the cathode or cathodes to be coated are immersed in the slurry, optionally with agitation of the slurry, and a vacuum is applied through the cathode chamber. This is the so-called "vacuum-drawn" method usd for preparing a diaphragm from such a slurry.

Usually the vacuum used initially, where vacuum deposition is employed to deposit the slurry on to a substrate such as a cathode, starts at zero millimeters of mercury and then may vary from about 20 to 250 millimeters of mercury (less than 1.0 to 10 inches of mercury), later increasing to a more elevated vacuum, such as at equipment capacity, e.g., to about 650 to 750 millimeters (about 25 to 30 inches). The build up from the initial to the more elevated vacuum can suitably be accomplished in from about 5 to about 30 minutes. Often, the more elevated, usually capacity, vacuum will be held for from 5 to about 30 minutes, with the shorter times typically being maintained where a longer time for reaching vacuum capacity has been employed. Such times should be sufficient for providing a desirable, uniform coating on the substrate. The thus-coated substrate, such as a cathode, is then removed and dried, which may simply be air drying, but is most always dried at an elevated temperature, e.g., from about 50° C., up to about 130° C., with a temperature within the range of from about 70°-100° C. being more typical. At elevated temperature, drying time can be on the order of from about 0.5 hour to 4 hours or more, but for economy will usually not exceed 3 hours. By following such procedures, a separator typically having a thickness of from about 0.03 to 3 centimeters (from about 5 to 500 mils), and more usually from about 0.3 to about 1.5 centimeters (from about 50 to about 250 mils) is obtained.

The next step is that of heating the diaphragms at a temperature and for a time dependent upon the identity of the polymer component employed in the composite inorganic/polymer fibers. Generally, the temperature and and time will be that sufficient to cause the composite inorganic/polymer fibers to soften for fusing adjoining fibers but insufficient to lead to any significant decomposition of the polymeric material. By way of representation, for a fiber composite having PTFE polymer, a polymer fusion temperature for the composite fibers of from about 300° C. to about 390° C. can be serviceable, with a temperature within the range of 325°-370° C. being more typical. Usually, the heating is from about 0.25 hour to 3 hours, and more preferably for economy is from about 0.25 to 1.5 hours. It is to be understood that the above-mentioned drying plus the heating for fusion can be a one-step procedure, usually with gradually increasing temperature from an initial drying to subsequent polymer fusion of adjoining fibers.

The requisite heating may be attained for example by inserting the preformed diaphragm or diaphragm coated cathode into an oven. It is important that the entire diaphragm be allowed to reach the requisite temperature in order to assure maximum and complete polymer fusion. The temperature and time employed will be that sufficient to allow the inorganic/polymer composite fibers to fuse together thereby forming a mechanically stable, permeable mat, e.g., a mat coating on a cathode. Owing to the nature of the polymer employed, a discontinuous inorganic/polymer composite fiber diaphragm can be obtained. The diaphragm, or diaphragm coated cathode is then allowed to cool to room temperature and is then typically ready for assembly in a chlor-alkali cell.

The cathodes on which the present dimensionally stable, inorganic/polymer composite fiber diaphragms are placed are generally any cathodes on which a diaphragm can be directly deposited or on which a preformed diaphragm, usually in mat form, can be placed. Preferred cathodes generally comprise an integral part of the cathode can, traversing the width of the cell and being designed to interleave in an alternate fashion with a plurality of vertically disposed anodes. Exemplary of such cathodes are those described in U.S. Pat. No. 2,987,463. These cathodes are typically foraminous in nature, e.g., mesh, perforated sheet or expanded metal, usually being constructed of a wire screen, and define an interior catholyte chamber. Cathode materials of construction include any of those used in such art, such as nickel, steel and alloys of such metals.

The product of the above-described preferred process is a uniform and coherent diaphragm, which may further be an adherent diaphragm coating directly on a cathode. The deposited diaphragm will typically have a weight per unit of surface area of between about 3 to 12 kilograms per square meter and more typically from about 4-7 kilograms per square meter for exemplary diaphragms from zirconia-PTFE composite fibers. For other fibers, containing titania in place of zirconia, such weight may be even less, such as below 3 or even less. The diaphragm typically exhibits substantially no swelling under operating cell conditions as compared to the prior art polymer-modified asbestos diaphragms which normally swell around 25 percent. Moreover it is easily possible in the present invention to readily deposit the diaphragm on a cathode and yet have essentially none of the diaphragm extending through the plane defined by the mesh cathode. This can provide for enhanced hydrogen gas release, such as upon comparison with conventional diaphragms which can be partially pulled through this plane by the vacuum deposition step. It has also been found that diaphragm coated cathodes of the present invention provide for ease of removal of the diaphragm from the cathode. Most importantly, used diaphragms, such as those using the preferred PTFE polymer and zirconia fiber can be simply and readily disposed of, without special handling or precautionary concern for any health hazards that can be associated with the disposal of conventional diaphragms.

REPRESENTATIVE COMPOSITE FIBER PREPARATION

As a typical example, an inorganic/polymer composite fiber is made as follows. A paste is prepared by mixing, for instance, zirconia as the inorganic and polytetrafluoroethylene as the polymer. The mix comprises 110 grams of polymer dispersion containing about 60 weight percent solids dispersed in water, including about 6 weight percent nonionic wetting agent, based on the weight of solids, and having general polymer particle size range of 0.05-0.5 micron. The mix also contains 150 grams of $ZrO_2$ powder, and 800 grams of salt (NaCl). These ingredients are ground in a ball mill grinder with 0.5 inch diameter steel balls. The ball mill grinder is pre-warmed and the mix is placed in the mill and ground with heating at 140° C. for about 1 hour. During the first 10 minutes of heating, the mill is vented to allow escape of the moisture from the aqueous polymer dispersion. The product mixture is then screened with a 0.375 inch mesh screen to remove the steel balls. If desired, the product mixture may then be washed in water to remove most, if not all, of the residual salt. The resultant product is highly branched zirconia-polytetrafluoroethylene composite fibers in general having a length/diameter ratio of greater than 2.

In order that those skilled in the art may more readily understand the present invention and certain preferred embodiments by which it may be carried into effect, the following specific examples are afforded.

EXAMPLE 1

A slurry medium is prepared by dispersing in 1 liter of water, 1 gram of a tan, powdered xanthan gum derivative having a pH of 5.0-6.6 at a one weight percent concentration in deionized water (Kelzan TM S sold by Kelco Co.) and continuing the mixing for 15 minutes. To the 1 liter thickened water slurry there is then added, with mixing and 275 grams (50 weight percent of fibrids plus residual salt) of inorganic/polymer composite fibrid and salt mixture. This fibrids mixture comprises zirconia as the inorganic and polytetrafluoroethylene as the polymer along with residual salt and is prepared as described in the paragraph above. Mixing with a dispersator is continued for 10 minutes to 1 hour to obtain a uniform slurry.

A mesh cathode (0.093 inch (0.236 cm.) steel wire calendared to a thickness of 0.155 inch (0.394 cm.)) is positioned horizontally near the bottom of a depositing box. The slurry is then placed on top of the cathode inside of the depositing box and a vacuum is applied to the opposite side of the cathode, said vacuum increasing from 0 to 17 inches (0-43 cms.) (Hg gauge) during an 11 minute cycle and holding at full vacuum for 10 minutes. The deposit covered cathode can is then placed in an oven and dried at 95° C. for 3 hours, and heated at an elevated 345° C. for 1 hour to fuse the diaphragm. The polymer of the composite fibers softens and coats the cathode, forming a perforate polymer coating. At the elevated temperature, adjacent fibers fuse together at points of contact, thereby obtaining a matted fiber coating that preserves organic particles at the surface of the interconnected fibers of the mat. There results a discontinuous inorganic/polymer composite fiber coating on the surface of the cathode. The diaphragm coated cathode is then allowed to cool to room temperature for assembly in the cell. The product of the above-described preferred process is a uniform, adherent, and coherent diaphragm coating directly on the cathode, which coating typically exhibits substantially no swelling under operating cell conditions as compared to the prior art polymer-modified asbestos.

The thus prepared diaphragm coated cathode was gasketed and then was employed opposite from the dimensionally stable anode of a laboratory bench cell using narrow gap configuration and employing saturated brine as the anolyte at an operating temperature of about 90° C. When thus put into service, the performance of the cell equipped with the diaphragm as just described was not only superior to a cell with a conventional modified asbestos diaphragm but also exhibited longer operating life, safer operation, and greater resistance to changes in operating conditions. Results are summarized in Table I below.

EXAMPLE 2

The general procedure of Example 1 was followed except that the zirconia/polytetrafluoroethylene composite fibrids were produced using a Ribbon Blender mixer instead of a ball mill. The composite fibrids are added to a water slurry thickened with 0.9 gram per liter of water of a xanthan gum derivative thickener, and a vacuum cycle is applied to deposit fibrids directly on a mesh cathode. Drying and heating as in Example 1 is then applied. The resultant highly branched zirconia-PTFE composite fibrids having been fused were then employed in a chlor-alkali cell for 39 days with an average performance of 3.09 volts at a current density of 1 amp per square inch and a current efficiency of 91.2 percent with production of 133 grams per liter of NaOH concentration, yielding a power consumption of 2270 kilowatt hours per metric ton NaOH. Results are summarized in Table I below.

EXAMPLE 3

A 20 liter depositing bath for vertical deposition was prepared having a 1 gram per liter xanthan gum derivative thickened water slurry. To this was added 4000 grams of mix material of inorganic/polymer composite fiber and salt as in Example 1. Mixing agitation was conducted with the use of a dispersator. The slurry bath was agitated with an air sparger prior to deposition to maintain bath uniformity. The cathode can with cathode in place was lowered in the depositing tank with slurry bath completely covering the cathode can assembly. For 10 minutes, a vacuum cycle increasing from 0 to 17 inches (0-43 cms.) was employed and then followed by a 10 minute hold at the 17 inch maximum vacuum.

The deposited cathode can was placed in the oven and dried at 100° C. overnight and heated at 350° C. for 1 hour to fuse the diaphragm. Operating results are described in Table I.

EXAMPLE 4

A slurry of 2.5 grams per liter xanthan gum derivative in water with 275 grams of mixed salt and composite fibrid, as in Example 1, was blended with the aid of a dispersator. The vacuum cycle applied was from 0 to 17 inches (0-43 cms.) over 7 minutes with a 7 hour hold at the full vacuum. The diaphragm was dried at 104° C. for 3 hours and heated at 345° C. for 15 minutes to fuse the diaphragm, with operating results reported in Table I.

EXAMPLE 5

A water only slurry of 1.5 liters was used with 830 grams of mixed inorganic/polymer fiber and salt, as in Example 1, and employing a dispersator for fibrid dispersion. The vacuum cycle was conducted from 0–17 inches (0–43 cms.). The diaphragm was dried at 100° C. for 1 hour and baked at 345° C. for ½ hour, with operating results reported in Table I.

EXAMPLE 6

A slurry comprising 0.9 gram per liter xanthan gum derivative in water with 275 grams of mixed salt and composite fibrid, as in Example 1, was fully mixed and subsequently deposited onto the cathode. The vacuum cycle was run from 0–17 inches (0–43 cms.) over 10 minutes with final vacuum of 17 inches achieved and held for 15 minutes. The diaphragm was dried at 115° C. for 2 hours and baked at 345° C. for ½ hour. See Table I for cell performance.

EXAMPLE 7

A slurry comprising 1.0 gram per liter xanthan gum derivative in water with 275 grams of mixed salt and composite fibrid, as in Example 1, is prepared. The slurry is prepared by adding the mixed salt and composite fibrid during dispersator agitation of the thickened water. A deposit vacuum cycle of 0 to 17 inches (0–43 cms.) for 12 minutes was used with excess filtrate being removed from the front side. Final vacuum was held briefly with cathode can and diaphragm being dried at 120° C. for 1 hour and bake cycle being at 350° C. for 1.2 hour. Cell performance results are in Table I.

TABLE I

INORGANIC/POLYMER COMPOSITE DIAPHRAGM OPERATING DATA

| Ex. No. | Days on Line | Volts* 1 ASI | CE %* | NaOH Conc g/l | Power** KWH/MT NaOH | Brine Head (inch) |
|---|---|---|---|---|---|---|
| 1 | 75 | 2.87 | 91.0 | 130 | 2113 | 1.9 |
| 2 | 39 | 3.09 | 91.2 | 130 | 2270 | 3.5 |
| 3 | 117 | 3.10 | 93.3 | 134 | 2226 | 2.0 |
| 4 | 82 | 2.97 | 92.5 | 130 | 2151 | .8 |
| 5 | 181 | 3.29 | 90.0 | 134 | 2449 | .8 |
| 6 | 31 | 3.20 | 90.5 | 130 | 2369 | 2.75 |
| 7 | 133 | 3.02 | 90.4 | 130 | 2238 | 4.0 |

*1 ASI (amp per square inch) = 6.45 amps per square centimeter. CE = Current Efficiency
**The power in Table I is calculated in kilowatt hours per metric ton of NaOH.

EXAMPLE 8

Four additional diaphragms were prepared in a manner similar to Example 1, and the current efficiency of each in operation compared with the current efficiency of a commercial plant average for chlor-alkali cells containing "SM-2 ™" asbestos and polytetrafluoroethylene diaphragms made according to U.S. Pat. No. 4,444,640 in operation. The results are reported in Table II below.

TABLE II

ADDITIONAL INORGANIC/POLYMER COMPOSITE DIAPHRAGM OPERATING DATA

| Diaphragm | Weight | GAP** | VOLTS* | BRINE HEAD* | % CCE* | KWH* per ton Cl$_2$ |
|---|---|---|---|---|---|---|
| 131661021 | 170 G. | ZERO | 2.78 | 0.18" | 90.4 | 2109 |
| 131661172 | 140 G. | ⅛" | 2.84 | 0.82" | 89.9 | 2166 |
| 131661191 | 138 G. | ⅛" | 2.90 | 0.84" | 91.9 | 2164 |
| 131661241 | 128 G. | ZERO | 2.99 | 0.70" | 93.9 | 2184 |
| SM-2 AVG | 36 G. | ⅛" | 2.97 | 4–10" | 93.1 | 2188 |

*All values are corrected to operation at 1 ASI, 95 degrees C., and production of 135 grams per liter NaOH concentration. The brine head was measured in inches. KWH refers to kilowatt hour. CCE refers to the corrected current efficiency. G = gram and AVG, = average.

**GAP refers to the spacing between the anode and diaphragm surfaces. Spacing of ⅛ inch (0.3175 cm.) is normal for commercial operation; however, dimensionally stable diaphragms as in the present invention can be operated with the anode flush against the diaphragm surface, or at "zero gap". Reduction of this spacing from ⅛ inch to zero normally results in savings of about 50 mV. or 35 Kilowatt Hour per short ton of chlorine.

What is claimed is:

1. A method for forming an electrolyte permeable diaphragm on a foraminous structure for use in an electrolytic cell, which method comprises establishing an aqueous slurry by introduciing to an aqueous madium as a particulate fiber material a non-isotropic organic and inorganic composite fiber comprising, in adherent combination, from about 5 percent to about 70 percent by weight organic halocarbon polymer fiber together with from about 30 percent to about 95 percent by weight of very finely-divided inorganic particulates impacted into said polymer fiber, said fiber material being in said slurry together with sufficient thickening agent to provide at least about 0.5 gram per liter of thickening agent to said aqueous slurry, drawing the slurry through a foraminous substrate to deposit particulate materials thereon in the form of a diaphragm, drying the deposited diaphragm and heating same to allow the organic polymer of the composite fibers to fuse together.

2. The method of claim 1, wherein said slurry is formed to contain 0.5–2.5 grams of thickening agent per liter of said slurry.

3. The method of claim 1, wherein the concentration of composite fibers in the slurry is within the range of 50 to 300 grams per liter.

4. The method of claim 1, wherein said slurry is formed with polymer fibers prepared from polymer granules having a particle size within the range of 0.05 to 200 microns and provided by polymer selected from the group consisting of polyvinyl fluoride, polyvinylidene fluoride, polytetrafluoroethylene, polychlorotrifluoroethylene, polyperfluoroethylene propylene, the copolymer of ethylene and chlorotrifluoroethylene, polyfluoroalkoxyethlene polymers and mixtures of the foregoing.

5. The method of claim 4, wherein said polymer fibers include branched fibers being within the range of from 1 micron to about 30,000 microns and with the length-/diameter ratio for said fiber composite being greater than 2/1.

6. The method of claim 1, wherein said inorganic particulates comprise very finely-divided substituents selected from the group consisting of metal oxides, metal carbides, metal borides, metal silicides, metal sulfides, metal nitrides, silicates, aluminates, ceramics, cermets, carbon, metals, alloys or mixtures thereof.

7. The method of claim 1, wherein said aqueous slurry is formed to include as additional particulate material from about 10 percent to about 1,000 weight percent, based on weight of said composite fiber, of additional particulate material in mixture with said composite fiber.

8. The method of claim 7, wherein said slurry is formed to include a solid, granular, inert and water soluble, additional particulate material thereby solubilizing said additional particulate material in said aqueous medium.

9. The method of claim 7, wherein said slurry is formed to include a solid, granular, inert and water insoluble additional particulate material in said aqueous medium.

10. The method of claim 1, wherein said slurry is formed with water containing from 0.05 to about 0.5 weight percent of basic substance.

11. The method of claim 1, wherein said slurry is formed with water containing from greater than 30 weight percent basic substance up to saturation of said basic substance.

12. The method of claim 1, wherein said depositing is by means of a pressure differential starting with 0 millimeter vacuum and increasing to 350–650 millimeters vacuum during 5–30 minutes followed by maintaining such elevated vacuum 5–30 minutes.

13. The method of claim 1, wherein said drying comprises a drying temperature of 70°–30° C. for about 0.5–3.0 hours and said heating comprises a polymer fusing temperature of 300°–390° C. for about 0.25–3 hours.

14. A diaphragm made in accordance with the method of claim 1.

15. The method of claim 1 wherein said slurry is formed to include asbestos fibers in said aqueous medium.

16. A diaphragm made in accordance with the method of claim 15.

17. A slurry adapted for processing in the method of claim 1 for forming an electrolyte permeable diaphragm separator for an electrolytic cell, said slurry comprising a non-isotropic organic and inorganic composite fiber of 5 to 70 weight percent organic halocarbon polymer fiber in adherent combination with from about 30 to 95 weight percent of very finely-divided inorganic particulates, said slurry further containing at least about 0.5 gram per liter of thickening agent.

18. The slurry of claim 17, wherein there is present from 50 to 200 grams per liter of composite fiber comprising polytetrafluoroethylene polymer fiber together with finely-divided zirconia particulates.

19. The slurry of claim 17, wherein said slurry contains from about 0.5 to 2.5 grams per liter of a xanthan gum derivative thickening agent.

20. A method for forming an electrolyte permeable diaphragm on a foraminous structure for use in an electrolytic cell, which method comprises establishing an aqueous slurry by introducing to an aqueous medium as particulate material a non-isotropic organic and inorganic composite fiber comprising from about 5 percent to about 70 percent by weight organic halocarbon polymer fiber and from about 30 percent to about 95 percent by weight of very finely-divided inorganic particulates bound in said polymer fiber, and from about 10 percent to about 1,000 weight percent based on the weight of said composite fiber, of additional particulate material in mixture with said composite fiber, drawing the slurry through a foraminous substrate to deposit particulate materials thereon in the form of a diaphragm, drying the deposited diaphragm and heating same to allow the organic polymer of the composite fibers to fuse together.

21. The method of claim 20, wherein said slurry is formed to include a solid, granular, inert, water soluble or water insoluble additional particulate material.

22. The method of claim 20, wherein said additional particulate material comprises NaCl, CaZrO$_3$, alumina, limestone, sand, graphite, or mixtures thereof.

23. The method of claim 20, wherein the concentration of composite fibers in the slurry is within the range of 50 to 300 grams per liter.

24. The method of claim 20, wherein said slurry is formed with water containing from 0.05 weight percent of basic substance up to saturation of said basic substance.

25. A diaphragm in accordance with the method of claim 20.

26. The method of claim 20 wherein said slurry is formed to include asbestos fibers in said aqueous medium.

27. A diaphragm made in accordance with the method of claim 26.

28. A method for forming an electrolyte permeable diaphragm on a foraminous structure for use in an electrolytic cell, which method comprises establishing an aqueous slurry by introducing to an aqueous medium as particulate material a non-isotropic organic and inorganic composite fiber comprising from about 5 percent to about 70 percent by weight organic halocarbon polymer fiber and from about 30 percent to about 95 percent by weight of very finely-divided inorganic particulates bound in said polymer fiber, from about 10 to about 1,000 weight percent, based on the weight of said composite fiber, of additional particulate material in mixture with said composite fiber, and at least about 0.05 weight percent of base as well as sufficient thickening agent to provide at least about 0.5 gram per liter of thickening agent to said aqueous slurry, drawing the slurry through a foraminous substrate to deposit particulate materials thereon in the form of a diaphragm, drying the deposited diaphragm and heating same to allow the organic polymer of the composite fibers to fuse together.

29. A diaphragm made in accordance with the method of claim 28.

30. A method for forming an electrolyte permeable diaphragm on a foraminous structure for use in an electrolytic cell, which method comprises (1) establishing an aqueous slurry by introducing to an aqueous medium particulate fiber material of asbestos fiber along with non-isotropic organic and inorganic composite fiber, which composite fiber comprises, in adherent combination, from about 5 percent to about 70 percent by weight organic halocarbon polymer fiber together with from about 30 percent to about 95 percent by weight of very finely-divided inorganic particulates impacted into said polymer fiber, (2) drawing the slurry through a foraminous substrate to deposit particulate materials thereon in the form of a diaphragm, (3) drying the deposited diaphragm and (4) heating same to allow the organic polymer of the composite fibers to fuse together.

31. A diaphragm made in accordance with the method of claim 30.

32. A deposited diaphragm, deposited from a slurry on a foraminous substrate, said diaphragm having non-isotropic organic and inorganic composite fibers of 5 to 70 weight organic halocarbon polymer fiber in adherent combination with from about 30 to 95 weight percent of very finely-divided inorganic particulates impacted into said fiber during fiber formation, said deposited diaphragm having a weight per unit of surface area of between about 3 and about 12 kilograms per square meter.

* * * * *